Aug. 6, 1968    W. B. DANCY    3,395,980
PRODUCTION OF POTASSIUM SULFATE
Filed March 21, 1963
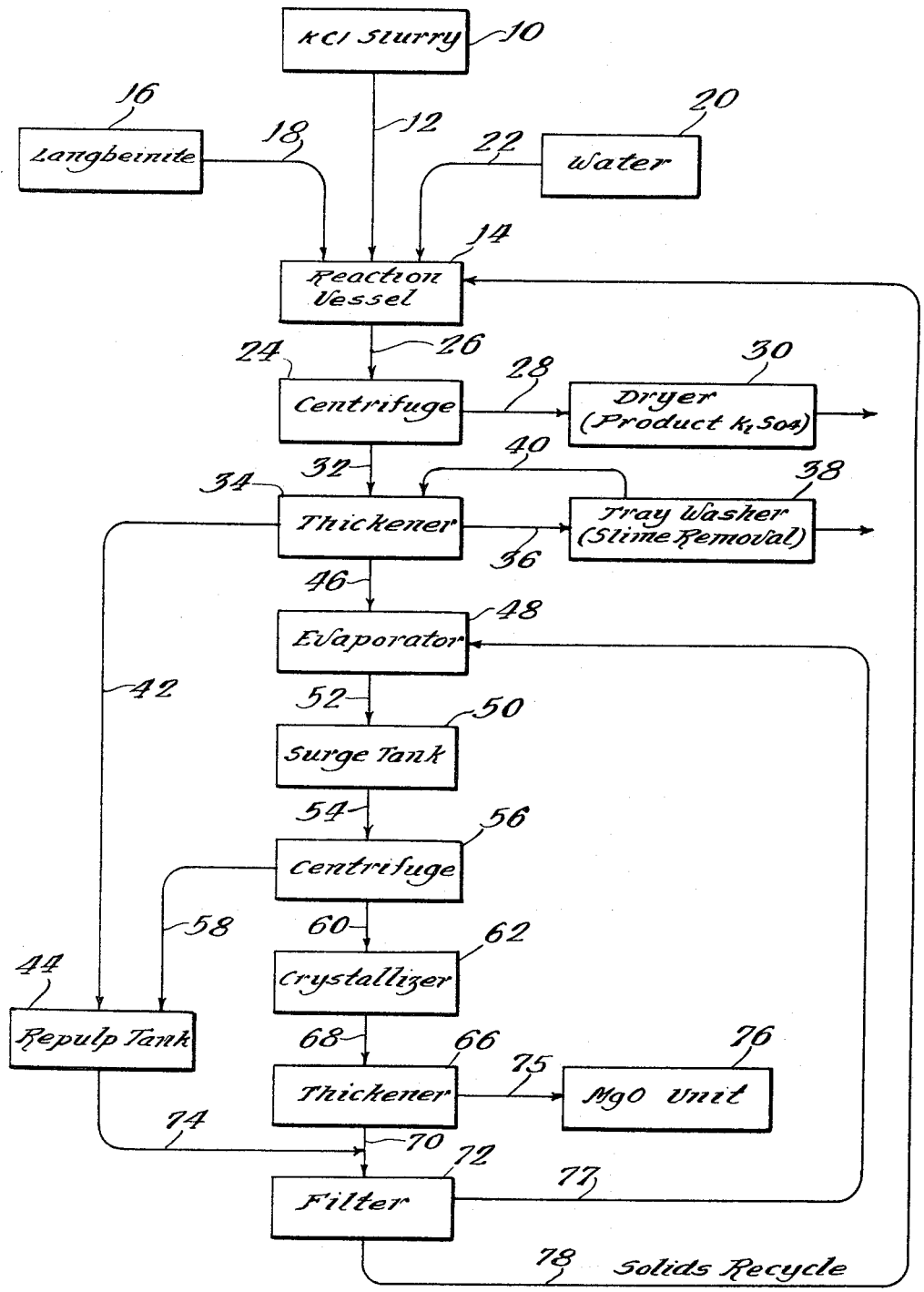
Inventor:
William B. Dancy 3,395,980
PRODUCTION OF POTASSIUM SULFATE
William B. Dancy, Lakeland, Fla., assignor to International Minerals & Chemical Corporation, a corporation of New York
Filed Mar. 21, 1963, Ser. No. 267,030
12 Claims. (Cl. 23—121)

The present invention generally relates to the production of potassium sulfate. In a more particular aspect the present invention relates to improvements in a process for the production of potassium sulfate by the reaction in aqueous medium of potassium chloride with a potassium-magnesium double sulfate.

Complex salts containing magnesium sulfate and potassium sulfate occur naturally in many potash ores, such as the potash ores that are found in the European deposits and in the Permian Basin of the southwest area of the United States and mined chiefly in the Carlsbad district of New Mexico. Such complex salts may also be recovered from brines and may be prepared from potash compounds. It is frequently desirable to separately recover the potassium values and/or magnesium values from these complex salts and many processes to effect the separation have been developed.

The potassium values in langbeinite ores generally are recovered by reacting langbeinite with an aqueous solution of potassium chloride to produce potassium sulfate. Potassium sulfate crystals form in the solution and are recovered. The potassium sulfate mother liquor is frequently processed by one or another procedure to recover the magnesium values therefrom. This prior process for the preparation of potassium sulfate from complex salts containing magnesium sulfate and potassium sulfate has found wide acceptance and is commercially practiced.

In all phases of the prior art process the process liquors are essentially saturated with potassium chloride and langbenite. It has now been found that by utilizing a discovered inverse solubility relationship which exists between langbenite and potassium chloride, an improved process can be derived by which the recovery of potassium sulfate for a given input of langbeinite and potassium chloride to the reaction vessel is increased.

It is an object of this invention to provide an improved process for the production of potassium sulfate from langbeinite and potassium chloride.

It is another object of this invention to provide an ore beneficiation process by which a greater recovery of potassium as potassium sulfate from langbeinite than has heretofore been possible can be achieved.

Yet another object of this invention is to provide a process for the recovery of potassium values from langbeinite ore as potassium sulfate, which process includes a by-product stream which consists of substantially pure crystallized potassium chloride which may be sold as a by-product or recycled as input to the process.

Briefly, this invention resides in an improvement over the prior art process for the production of potassium sulfate by the reaction, in aqueous medium, of potassium chloride with potassium-magnesium double sulfate salts, of which at least one such salt is langbeinite. It has been discovered, and this invention is in part based on these discoveries, that the solubility of langbeinite in an aqueous medium containing potassium chloride is inversely proportional to the temperature of the aqueous medium, and that langbeinite in a hot aqueous potassium chloride-containing medium forms a super-saturated solution, and does not immediately crystallize when the concentration of the solution is increased beyond the solubility limit of the langbeinite. In accordance with this invention, potassium-magnesium double sulfate salts are reacted with potassium chloride in an aqueous medium, potassium sulfate is recovered as product in the conventional manner, and the aqueous medium (mother liquor) is evaporated at elevated temperature to crystallize potassium chloride and some langbeinite, the aqueous medium being super-saturated with langbeinite. The evaporation is continued until the sodium chloride content of the resulting slurry closely approaches the solubility limit of sodium chloride in the aqueous slurry at 30° C. The slurry is maintained at a temperature of 80° to 100° C. for 1 to 5 hours without further evaporation to crystallize the langbeinite from the super-saturated slurry. The langbeinite is preferably converted to leonite and is recycled as feed to the initial reaction. The liquid phase from the separation of langbeinite is cooled to crystallize potassium chloride in substantially pure form. The potassium chloride is separated and the remaining liquid is discarded to reject sodium chloride as a substantially saturated aqueous solution.

As hereinbefore set forth, complex salts containing magnesium-potassium sulfate occur naturally in many potash ores. Examples of the complex salts contemplated as starting materials in the process of this invention are the potassium-magnesium double sulfates, langbeinite ($2MgSO_4 \cdot K_2SO_4$), leonite ($MgSO_4 \cdot K_2SO_4 \cdot 4H_2O$), and schoenite ($MgSO \cdot K_2SO_4 \cdot 6H_2O$). These complex salts can be utilized in pure or impure form, with the higher grades or purities being preferred.

The reaction of these complex salts with the potassium chloride is effected in an aqueous medium, however, it is necessary that solid salts, such as substantially dry langbeinite, be admixed with the potassium chloride. Solid mixtures of langbeinite and one or more of the complex salts may also be used in the process of this invention. The complex salts are used in solid form and they are preferably in sub-divided form smaller than 20 mesh, more preferably smaller than 100 mesh, and still more preferably at least 95% smaller than 200 mesh. The solid complex salts may, of course, be slurried in water or other aqueous solution, preferably a brine, before admixing with the langbeinite. The complex salt is used as a solid since it is desirable to maintain the amount of mother liquor from which the reaction product potassium sulfate is removed as low as possible.

Although in initiating the process only potassium chloride is used in the reaction mixture with the langbeinite with or without another double sulfate of potassium-magnesium and the bride, a slurry of recycled potassium salts, recovered from the mother liquor of the product, is preferably present in the reaction mixture and is employed once the process has been initiated. Potassium values present in the mother liquor from which the potassium sulfate product is separated are recovered largely as a mixture of leonite ($K_2SO_4 \cdot MgSO_4 \cdot 4H_2O$) and potassium chloride.

The process is initiated by admixing the solid complex salt, preferably langbeinite, and potassium chloride with an aqueous solution, which is preferably a brine substantially saturated with respect to potassium chloride. A potassium sulfate crystal product is formed and separated from the resultant mixture. The resulting mother liquor from which the product potassium sulfate has been separated will contain dissolved salts of chlorides and sulfates of sodium, potassium, and magnesium, the sodium having been introduced with one or more of the starting materials. This mother liquor is concentrated to a point such that on cooling to 30° C. the liquor becomes substantially saturated with respect to sodium chloride. A salt mixture composed of langbeinite and potassium chloride crystallizes after evaporation, and langbeinite continues to crystallize from the supersaturated solution if the solution is maintained at a temperature in the range of 80° to 100° C. for 1 to 5 hours. The separated langbeinite and potassium chloride are preferably repulped with aqueous liquor containing potassium chloride, and preferably potassium sulfate mother liquor. The repulped mixture is maintained at a temperature of 50° to 65° C. for a sufficient time, about 1 to 5 hours, to convert a major portion, preferably as much as 90%, of the langbeinite to leonite. There is a concomitant production of magnesium chloride. The reaction proceeds according to the equation:

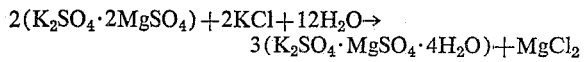

$$2(K_2SO_4 \cdot 2MgSO_4) + 2KCl + 12H_2O \rightarrow$$
$$3(K_2SO_4 \cdot MgSO_4 \cdot 4H_2O) + MgCl_2$$

Due to the take-up of water of hydration the aqueous liquor is maintained at high concentration during the reaction, with a resulting reduction in evaporator load. The aqueous liquor employed in the repulp step is preferably a portion of the mother liquor (aqueous medium) from which the product potassium sulfate was crystallized. The separated aqueous fraction of the mother liquor, after separation of langbeinite and potassium chloride in the centrifuge, is cooled to a temperature in the range of 25° to 40° C., preferably about 30° C., and the additional potassium chloride is crystallized and separated. The resulting cooled liquor is substantially saturated with sodium chloride, and is rich in magnesium chloride. Sodium chloride is rejected from the system by discard of this liquor. This feature is important, since recycle of the sodium chloride would result in a sodium chloride build-up in the system. A sodium chloride concentration in excess of about 1.1% sodium in the primary reaction mixture for the production of potassium sulfate causes the potassium sulfate field to substantially disappear. The discard liquor, rich in sodium chloride and magnesium chloride, can be fed as input to a MgO recovery unit. By separating langbeinite at high temperature and permitting sufficient time at high temperature for crystallization of super-saturated langbeinite from the aqueous phase, the amount of langbeinite lost in the discard liquor is greatly reduced, due to the lower solubility of langbeinite in the liquor at high temperature.

The potassium chloride crystallized from the aqueous phase is mixed with the repulped (and converted) langbeinite reaction mixture, and together they are filtered to separate the liquid content thereof. The liquid content is recycled to the evaporator step, and the solids are preferably recycled as feed to the primary reaction where the potassium values are recovered.

In carrying out a preferred embodiment of the process, the recovered salt mixture containing leonite and potassium chloride, which is recycled as feed, is admixed with a brine substantially saturated with respect to potassium chloride at a temperature between about 25° C. and about 35° C. Sufficient water is added to the langbeinite reaction mixture to reduce the sodium chloride content below its saturation point in the mixture of products resulting from the reaction. Sufficient dilution is necessary, because as the reaction of the langbeinite proceeds, magnesium chloride is formed, and as the concentration of magnesium chloride in the mixture increases, the solubility of sodium chloride in the solution decreases. Generally, the reaction mixture contains between about 4 and about 5 parts of water per part of langbeinite.

The langbeinite reaction mixture is agitated or stirred until the reaction has proceeded to substantial completion. Generally between about 4 hours and about 6 hours is sufficient time for substantial completion of the reaction. The potassium sulfate salt, as crystals, is separated from the mother liquor by any suitable means such as, for example, by filtration, decantation, centrifugation, etc. Magnesium sulfate is the chief impurity present in the potassium sulfate product. Magnesium sulfate does not, however, impair the usefulness of this product in fertilizers.

The mother liquor from which the product is separated is concentrated, for example, by evaporating at a temperature between about 80° C. and about 108° C. The mother liquor is concentrated as before described, to such point that when the concentrated liquor is cooled (after separation of crystallized potassium chloride and langbeinite) to a temperature between about 25° C. and about 40° C., potassium chloride is crystallized from the slurry, but substantially no sodium chloride is crystallized. In a preferred embodiment, the liquor is concentrated at about 98° C. in a submerged combustion evaporator until the sodium chloride content reaches saturation at a temperature in the range of 30° to 40° C., preferably at about 30° C. (a magnesium chloride concentration between about 15% and about 18%).

Referring now to the drawing, an aqueous slurry 10, the solid phase of which is potassium chloride, and the liquid phase of which is saturated with respect to potassium chloride, is conducted to reaction vessel 14 by means of line 12. Solid langbeinite (95%—200 mesh) 16 enters the reaction vessel 14 by means of line 18, and water 20 is conveyed to the vessel by line 22. The mixture is agitated at a temperature between about 45° C. and about 55° C. until the reaction proceeds to substantial completion, that is about six hours. Although only one reaction vessel is illustrated, more reaction vessels with a countercurrent process flow may be used. Such countercurrent processing is known to the art and therefore is not described herein. Thereafter, the reactant mixture is transferred to centrifuge 24 by means of line 26, and the potassium sulfate product is removed from the centrifuge 24 through line 28 and is conveyed to drier 30 and to storage.

The mother liquor or aqueous medium is withdrawn from centrifuge 24 through line 32 and is conducted to thickener 34 (a settling tank). The aqueous medium is withdrawn through line 36 to tray washer 38 for the removal of slimes, and is recycled to the thickener 34 through line 40. Supernatant liquid is withdrawn from thickener 34 through line 42 to repulp tank 44, and the thickened aqueous medium is withdrawn through line 46 to evaporator 48. The evaporator is maintained at about 98° C. The concentrated aqueous medium, now a slurry, from the evaporator is transferred to surge tank 50 by means of line 52, and then through line 54 to centrifuge 56. The capacity of the surge tank 50 is sufficient to provide a retention time of 1 to 5 hours for the crystallization of langbeinite from the super-saturated aqueous medium. The temperature in the surge tank is maintained at 80° to 100° C., preferably at about 90° C., but without further substantial evaporation. The aqueous medium, now a thick slurry, is centrifuged at 80° to 100° C. to separate a solids fraction which is passed through line 58 to repulp tank 44, and an aqueous fraction which is passed through line 60 to crystallizer 62. The aqueous fraction is cooled in the crystallizer to a temperature in the range of 25° to 40° C., preferably about 30° C. The resulting slurry is conveyed to thickener 66 by line 68 where solids comprising potassium chloride, substantially free of sodium chloride, are separated and removed by line 70 to filter 72. The filtrate, which contains magnesium chloride and sodium chloride, is removed by line 75 and is conducted to a magnesium oxide preparation unit 76. Repulped langbeinite (converted to leonite) is withdrawn from repulp tank 44 and carried to filter 72 through line 74. The liquid fraction from filter 72 passes through line 77 as recycle to evaporator 48, and the solids are recycled through line 78 as input to reaction vessel 14.

EXAMPLE

As an example of the process of this invention the reaction tank was charged as follows:

TABLE I

|  | K | Mg | Na | Cl | SO₄ | H₂O | Total |
|---|---|---|---|---|---|---|---|
| Langbeinite | 51.6 | 32.1 | 3.3 | 5.2 | 190.2 |  | 282.4 |
| KCl solution | 105.9 | .7 | 3.9 | 102.1 | 2.8 | 565.1 | 780.5 |
| Water |  |  |  |  |  | 418.5 | 418.5 |
| Mixed salt: |  |  |  |  |  |  |  |
| Leonite | 20.7 | 6.4 |  |  | 50.9 | 19.0 | 97.0 |
| Langbeinite | 2.0 | 1.2 |  |  | 7.4 |  | 10.6 |
| KCl | 82.7 |  |  | 75.2 |  |  | 157.9 |
| Entrained Liquor | 4.5 | 2.7 | .4 | 10.8 | 2.7 | 53.7 | 74.8 |
| Total | 267.4 | 43.1 | 7.6 | 193.3 | 254.0 | 1,056.3 | 1,821.7 |

The reaction proceeded at about 45° C. The initial temperature was slightly lower but the reaction is exothermic and equilibrium was established at about 45° C. The reaction reached substantial completion after about 4 hours. The reaction products were removed to the centrifuge and separated into solid product (potassium sulfate) and mother liquor, having the following compositions:

TABLE II

|  | K | Mg | Na | Cl | SO₄ | H₂O | Total |
|---|---|---|---|---|---|---|---|
| Mother liquor | 124.5 | 40.1 | 7.7 | 188.5 | 73.1 | 1,028.4 | 1,462.2 |
| Solids to drier | 142.9 | 3.0 |  | 4.8 | 180.9 | 27.9 | 359.5 |

The mother liquor (aqueous medium) was thickened, deslimed, and evaporated at about 98° C., until the sodium chloride content became nearly sufficient to saturate the aqueous medium at 30° C. (magnesium chloride content about 18%). The resulting slurry was maintained for about 90° C. without further evaporation for about 2 hours to permit the crystallization of langbeinite from the super-saturated slurry. The slurry was centrifuged at 90° C. The evaporation, crystallization and separation data are as follows:

TABLE III

|  | K | Mg | Na | Cl | SO₄ | H₂O | Total |
|---|---|---|---|---|---|---|---|
| Feed liquor | 95.3 | 39.2 | 7.5 | 173.7 | 53.3 | 988.1 | 1,357.1 |
| H₂O evaporation |  |  |  |  |  | 560.4 | 560.4 |
| Solids to repulp | 50.3 | 6.8 |  | 35.9 | 40.1 |  | 133.1 |
| Entrained liquor to repulp | 2.3 | 1.6 | .2 | 6.9 | .7 | 21.6 | 33.3 |

The solids from the centrifuge were transferred to the repulper and reacted with aqueous medium (mother liquor) withdrawn as supernatant liquid from the thickener. The repulper reaction proceeded at 60° to 65° C. to produce leonite and magnesium chloride. The repulper operation is summarized as follows:

TABLE IV

|  | K | Mg | Na | Cl | SO₄ | H₂O | Total |
|---|---|---|---|---|---|---|---|
| Mother liquor | 124.5 | 40.1 | 7.6 | 188.5 | 73.1 | 1,028.4 | 1,462.2 |
| Solids: |  |  |  |  |  |  |  |
| Langbeinite | 10.9 | 6.8 |  |  | 40.1 |  | 57.8 |
| KCl | 39.4 |  |  | 35.9 |  |  | 75.3 |
| Entrained Liquor | 2.3 | 1.6 | .2 | 6.9 | .7 | 21.6 | 33.3 |
| Liquor to Evaporators | 95.3 | 39.2 | 7.5 | 173.7 | 53.3 | 988.1 | 1,357.1 |
| Mixed salt to filter: |  |  |  |  |  |  |  |
| Leonite | 20.7 | 6.4 |  |  | 50.9 | 19.0 | 97.0 |
| Langbeinite | 2.0 | 1.2 |  |  | 7.4 |  | 10.6 |
| KCl | 55.0 |  |  | 50.1 |  |  | 105.1 |
| Entrained Liquor | 4.1 | 1.7 | .3 | 7.5 | 2.3 | 42.9 | 58.8 |

The liquid fraction from the centrifuge at 90° C. was cooled to 30° C. in the crystallizer and then thickened. These operations are summarized as follows:

TABLE V

|  | K | Mg | Na | Cl | SO₄ | H₂O | Total |
|---|---|---|---|---|---|---|---|
| Feed liquor | 42.7 | 30.8 | 7.3 | 130.9 | 12.5 | 406.1 | 630.2 |
| Evaporation |  |  |  |  |  | 31.0 | 31.0 |
| Reject liquor | 14.6 | 29.8 | 7.2 | 102.5 | 12.1 | 364.3 | 530.5 |
| KCl to filter | 27.7 |  |  | 25.1 |  |  | 52.8 |
| Entrained liquor to filter | .4 | 1.0 | .1 | 3.3 | .4 | 10.8 | 16.0 |

The solids from the filter were recycled as input to the reaction vessel, the data herein set forth being equilibrium data for the continuous operation.

In comparison with a similar operation in accordance with a prior art process in which the langbeinite content of the mother liquor was not recovered at high temperature after the evaporation step, but was recovered in part at low temperature with the recovery of potassium chloride in the crystallizer; establishes the extent of the economies which can be obtained through the process of this invention. To produce the same quantity of potassium sulfate having the same purity, the process of this invention permitted the use of about 9% less feed langbeinite, and about 2.7% less feed potassium chloride. These economies were made possible by the reduction in the loss of potassium values in the reject liquor.

The embodiments of the invention in which an exclusive property or privilege is claimed are defined as follows:

1. In a process for the production of potassium sulfate by the reaction of potassium chloride with langbeinite, in aqueous medium wherein some sodium chloride is present, with the crystallization and recovery of potassium sulfate from the aqueous medium, the improvement comprising evaporating sufficient water from at least a portion of the aqueous medium at elevated temperature to produce a concentrated aqueous slurry of potassium chloride and langbeinite, the aqueous phase of said slurry being supersaturated with langbeinite, the amount of water removed by evaporation being sufficient to substantially saturate the aqueous phase with sodium chloride at 30° C., maintaining said slurry at a temperature in the range of 80° to 100° C. without substantial further evaporation for a period of 1 to 5 hours to crystallize additional langbeinite, separating the slurry at 80° to 100° C. into a solids fraction and an aqueous fraction, cooling the aqueous fraction to a temperature in the range of 25° to 40° C. to crystallize potassium chloride without substantial crystallization of sodium chloride, and separating the crystallized potassium chloride from the aqueous portion of the aqueous fraction, repulping the solid fraction with brine containing chlorides and sulfates of potassium and magnesium at a temperature in the range of 50° to 65° C. to produce leonite and magnesium chloride, and recycling the leonite to the initial reaction.

2. The method in accordance with claim 1 in which the repulped solids fraction is mixed with the potassium chloride crystallized from said aqueous fraction, the resulting mixture is separated into a solid phase and a liquid phase, and the solid phase is recycled to the initial reaction.

3. The method in accordance with claim 2 in which said liquid phase is recycled as feed to the evaporation step.

4. The method in accordance with claim 2 in which said brine comprises a portion of said aqueous medium.

5. The method in accordance with claim 4 in which said repulped solids are maintained at a temperature of about 60° C. for about 2 hours before admixture with said crystallized potassium chloride.

6. The method in accordance with claim 5 in which said slurry is maintained at a temperature of about 90° to 95° C. for a period of about 2 hours.

7. The method in accordance with claim 6 in which the aqueous fraction is cooled to a temperature of about 30° C.

8. In a process for the production of potassium sulfate from langbeinite and potassium chloride the improvement comprising evaporating an aqueous liquor which is initially substantially free of solids, contains dissolved chlorides and sulfates of sodium, potassium, and magnesium, and is unsaturated with respect to sodium chloride to remove water in an amount sufficient to produce a slurry containing solid langbeinite and an aqueous phase supersaturated with respect to langbeinite, maintaining said slurry at a temperature of about 80 to about 100° C. for about 1 to 5 hours to crystallize additional langbeinite, separating the slurry into a solids fraction and an aqueous fraction, repulping the solids fraction at a temperature of about 50° C. to about 65° C. with a brine containing chlorides and sulfates of potassium and magnesium to convert at least a portion of the langbeinite to leonite, and recycling said leonite into admixture with fresh langbeinite.

9. The process in accordance with claim 8 in which said leonite is subsequently converted to potassium sulfate and magnesium chloride by reaction with potassium chloride in an aqueous medium and said potassium sulfate is crystallized from said aqueous medium and recovered.

10. The process in accordance with claim 9 in which said repulped solids are maintained at a temperature of about 60° C. for about 2 hours.

11. The process in accordance with claim 10 in which at least about 90% of the langbeinite in said repulped solids is converted to leonite.

12. The process in accordance with claim 10 in which said slurry is maintained at a temperature of about 90° C. to about 95° C. for a period of about 2 hours prior to the separation of the slurry into a solids fraction and an aqueous fraction.

References Cited

UNITED STATES PATENTS

| | | | |
|---|---|---|---|
| 2,684,285 | 7/1954 | Dancy | 23—121 |
| 2,804,370 | 8/1957 | Dancy | 23—121 |
| 2,809,093 | 10/1957 | Dancy | 23—121 X |

OSCAR R. VERTIZ, *Primary Examiner.*

EARL C. THOMAS, *Assistant Examiner.*